United States Patent
Harvey et al.

(10) Patent No.: US 7,919,938 B2
(45) Date of Patent: Apr. 5, 2011

(54) ACTUATOR ARRANGEMENT

(75) Inventors: John Herbert Harvey, Wolverhampton (GB); Stephen Harlow Davies, Shifnal (GB)

(73) Assignee: Goodrich Actuation Systems Limited (GB)

( * ) Notice: Subject to any disclaimer, the term of this patent is extended or adjusted under 35 U.S.C. 154(b) by 350 days.

(21) Appl. No.: 12/061,775

(22) Filed: Apr. 3, 2008

(65) Prior Publication Data

US 2008/0246421 A1 Oct. 9, 2008

(30) Foreign Application Priority Data

Apr. 4, 2007 (GB) .................. 0706524.6

(51) Int. Cl.
*F16D 65/14* (2006.01)
*H02K 7/06* (2006.01)
*H02P 3/00* (2006.01)
*H02P 7/00* (2006.01)

(52) U.S. Cl. ........... 318/14; 318/135; 310/80; 74/89.39; 74/89.23; 74/424.73; 340/686.3; 340/686.4; 340/686.6; 340/686.1; 340/679; 60/226.2; 60/230; 60/771; 239/265.19

(58) Field of Classification Search .................. 318/135, 318/14, 9; 310/80; 89/23, 37; 74/424.73, 74/89.39, 89.23, 89.24, 89.31; 244/110 B; 340/686.3, 686.1, 686.4, 686.6, 679; 60/226.2, 60/771, 230; 239/265.19

See application file for complete search history.

(56) References Cited

U.S. PATENT DOCUMENTS

| | | | | |
|---|---|---|---|---|
| 3,653,784 A | * | 4/1972 | Leitermann et al. | 417/317 |
| 4,198,786 A | * | 4/1980 | Monot | 49/362 |
| 4,442,928 A | * | 4/1984 | Eastman | 477/185 |
| 4,672,858 A | * | 6/1987 | Langowski | 74/89.38 |
| 4,747,320 A | * | 5/1988 | Nilsson | 74/411.5 |
| 5,070,985 A | * | 12/1991 | Davies et al. | 192/141 |
| 5,309,711 A | * | 5/1994 | Matthias | 60/226.2 |
| 5,564,677 A | * | 10/1996 | Levy et al. | 251/129.12 |
| 5,599,486 A | * | 2/1997 | Fujishiro et al. | 264/40.1 |
| 5,848,554 A | * | 12/1998 | Kober et al. | 74/89.35 |
| 6,167,694 B1 | * | 1/2001 | Davies | 60/226.2 |
| 6,494,033 B1 | * | 12/2002 | Davies | 60/226.2 |
| 6,519,929 B2 | * | 2/2003 | Ahrendt | 60/226.2 |
| 6,786,315 B1 | * | 9/2004 | Christensen | 192/48.7 |
| 6,810,656 B2 | * | 11/2004 | Kortum et al. | 60/226.2 |
| 6,974,107 B2 | * | 12/2005 | Christensen et al. | 244/101 |
| 2003/0184252 A1 | * | 10/2003 | Takamune et al. | 318/632 |
| 2005/0001095 A1 | * | 1/2005 | Christensen | 244/110 B |
| 2005/0081660 A1 | * | 4/2005 | Migliori | 74/25 |
| 2006/0169132 A1 | * | 8/2006 | Tucker | 92/8 |

FOREIGN PATENT DOCUMENTS

| | | |
|---|---|---|
| EP | 1004798 | 5/2000 |
| WO | 2004099602 | 11/2004 |
| WO | 2004113707 | 12/2004 |

OTHER PUBLICATIONS

Partial European Search Report dated Feb. 11, 2010.

* cited by examiner

*Primary Examiner* — Rita Leykin

(74) *Attorney, Agent, or Firm* — Andrus, Sceales, Starke & Sawall, LLP

(57) ABSTRACT

An actuator arrangement comprises a plurality of linearly extendable actuators arranged to be driven by a common electrically driven motor, each actuator, being provided with limit stops to limit extension and/or retraction thereof, wherein the limit stops of the actuators are positioned such that a first one of the actuators has a smaller range of permitted extension than at least a second one of the actuators.

13 Claims, 2 Drawing Sheets

ACTUATOR ARRANGEMENT

BACKGROUND OF THE INVENTION

This invention relates to an actuator arrangement and in particular to an actuator arrangement suitable for use in an electrically driven thrust reverser system for use in moving components of the thrust reverser system between stowed and deployed positions.

One form of thrust reverser system includes a pair of part generally cylindrical cowls each being arranged to be driven between stowed and deployed positions by a plurality of linearly extendable actuators. Commonly, the actuators used in this application have been hydraulically driven. However, the use of electrically powered thrust reverser systems is becoming more common.

One form of electrically powered thrust reverser system includes a cowl moveable by a plurality of ball or roller screw type actuators, for example three such actuators may be provided. A single electrically powered motor is used to drive all of the actuators associated with the cowl, an appropriate gear box and drive transmission system being provided to distribute and transmit power to the actuators and to ensure that the actuators operate in synchronism with one another at the same speed.

In normal use, the actuators are driven at high speed over the majority of their length, the motor being controlled to reduce the speed at which the actuators are driven as the actuators approach their stowed and fully deployed positions so that, when the stowed and fully deployed positions are reached, movement can be safely arrested by claw stops provided in the actuators. The stops are configured so that the stops of all of the actuators associated with the cowl engage to arrest further movement simultaneously.

There is a requirement for the stops provided in the actuators to be able to arrest movement even if the motor fails to slow the rate of operation of the actuators as they approach the stowed and fully deployed positions, for example as a result of a control failure in the thrust reverser control system resulting in the occurrence of a so called powered runaway condition in which the motor continues to be driven at full speed as these positions are approached.

One way in which the stops can be designed to be able to arrest such movement is to increase the radial height of the stops so as to enable them to withstand greater loadings as would occur in such circumstances. However, doing so would result in the diameter of the tail tube of each actuator being increased. As the actuators are approximately 1 m long, increasing the diameter of the tail tube even by a relatively small amount can result in a significant increase in the weight of the actuator arrangement, which is undesirable.

It is an object of the invention to provide an actuator arrangement in which the problem outlined hereinbefore is overcome or of reduced effect.

SUMMARY OF THE INVENTION

According to the present invention there is provided an actuator arrangement comprising a plurality of linearly extendable actuators arranged to be driven by a common electrically driven motor, each actuator being provided with limit stops to limit extension and/or retraction thereof, wherein the limit stops of the actuators are positioned such that a first one of the actuators has a smaller range of permitted extension than at least a second one of the actuators.

By arranging the limit stops in this manner, in normal use, only the limit stops of the said first one of the actuators will operate to arrest movement as the stowed and/or fully deployed positions are reached, the limit stops of the other actuators being redundant, in use, but useful during maintenance and fitting operations to avoid over extension of the actuator which may result in parts thereof becoming disengaged from one another. Consequently, only the limit stops of this one of the actuators need to be designed to withstand the increased loadings that may occur in the event of a control failure, and hence only the tail tube diameter of this one of the actuators needs to be increased. It will be appreciated, therefore, that a saving in the weight of the actuator arrangement can be achieved.

Conveniently, the limit stops of the first actuator engage to arrest movement both when the actuator reaches its fully deployed and stowed positions.

The first actuator is preferably provided with a position sensor, for example in the form of a linear variable differential transducer (LVDT), the output of which can be used by the control system of the thrust reverser actuator system to provide an indication of the position of the cowl thereof.

Preferably a series of drive shafts are provided to transmit drive to at least some of the actuators. The drive shafts may be capable of undergoing limited torsional movement. In such an arrangement, when the stops of the first actuator arrest movement thereof, limited continued movement of the remaining actuators may occur, such movement resulting in 'winding up' or torsional movement of the drive shafts. Such winding up of the drive shafts will apply a braking load to these actuators, preferably arresting movement thereof before the limit stops of these actuators engage.

The limit stops conveniently comprise claw stops.

The limit stop of the first actuator operable as the actuator reaches its fully deployed position is conveniently compliant. The limit stop operable as the first actuator reaches its stowed position may also be compliant, but this need not always be the case as the provision of larger limit stops capable of withstanding the loadings applied in the event of control failure leading to a powered runaway condition as the actuator reaches its stowed position need not involve the use of an increased diameter tail tube.

In one arrangement, the actuator includes a screw shaft of hollow form, and the compliant stop is provided by locating a torsion bar within the screw shaft, a stop member being associated with the torsion bar, the stop member projecting through a slot formed in the shaft and engageable by a stop associated with a nut translatable along the screw shaft. Stop members may be provided at or adjacent both ends of the torsion bar. Alternatively, a stop member may be provided at or adjacent just one end thereof. In either case, winding up of the torsion bar occurs, in use, when the nut reaches its stowed and/or fully deployed position, thus slowing and arresting further movement.

In another arrangement, at least one of the compliant stops may comprise a stop member spring biased towards a stop position such that, in use, once the stop position is reached, the spring biasing applies a braking load prior to arresting actuator movement.

The stop member may be mounted on the actuator shaft by means of an acme screw thread. The spring could comprise, for example, a coiled spring or, alternatively, may comprise at least one disc spring.

If desired, a spring biased stop may be provided to arrest actuator movement in one direction, a torsion bar arrangement being used to arrest movement in the opposite direction.

The invention also relates to an electrical thrust reverser system comprising an extendable actuator driven by an electric motor, the actuator including a rotatable screw shaft and a translatable nut, the actuator being provided with limit stops to limit the permitted range of extension of the actuator, wherein at least one of the limit stops is compliant.

The compliant limit stop may comprise a stop member biased by a spring towards a stop position. The stop member may be mounted upon the screw shaft of the actuator by means of an acme screw thread. The spring may comprise a coil spring, or alternatively may comprise at least one disc spring.

Alternatively, the compliant limit stop may be provided by locating a torsion bar within the screw shaft, a stop member being associated with the torsion bar, the stop member projecting through a slot formed in the shaft and engageable by a stop associated with the nut translatable along the screw shaft. Stop members may be provided at or adjacent both ends of the torsion bar. Alternatively, a stop member may be provided at or adjacent just one end thereof.

BRIEF DESCRIPTION OF THE DRAWINGS

The invention will further be described, by way of example, with reference to the accompanying drawings, in which.

DETAILED DESCRIPTION OF THE INVENTION

Figure 1:
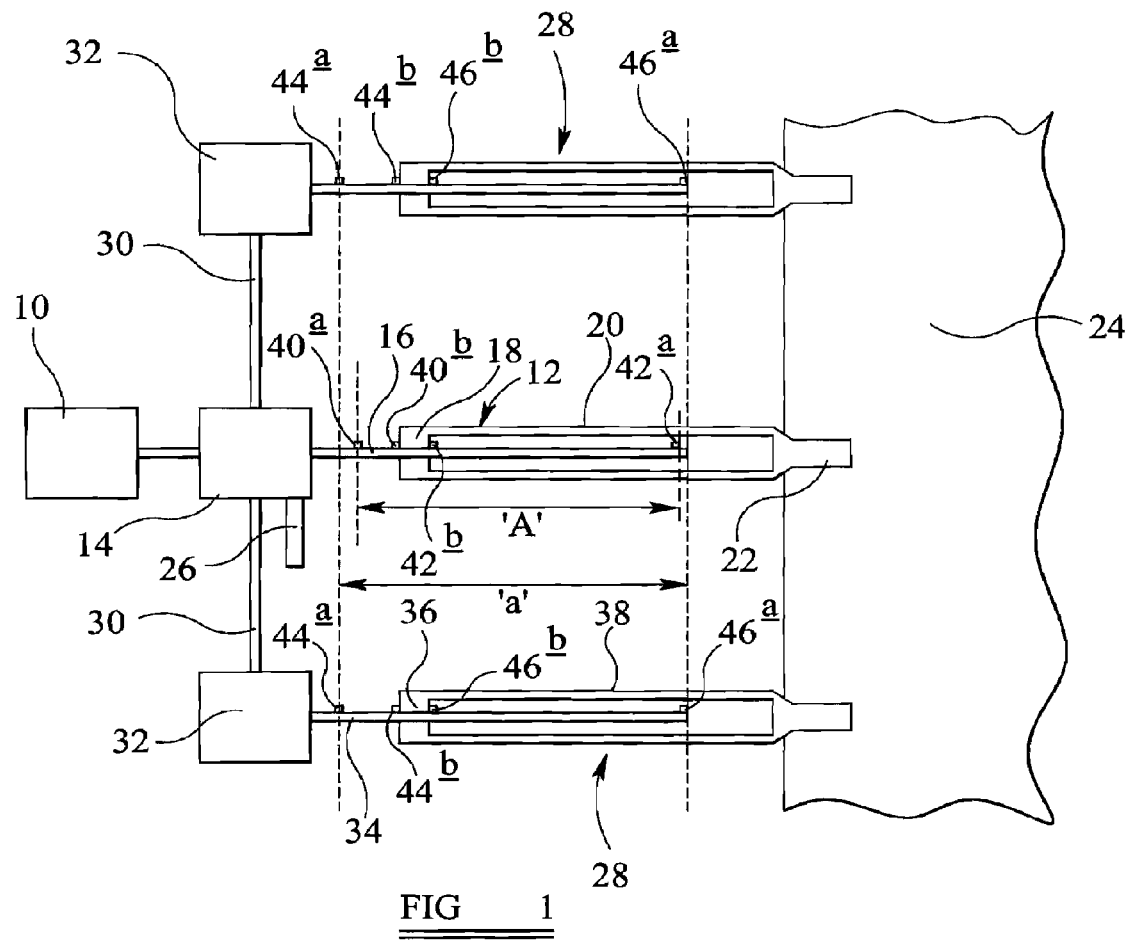
FIG. 1 is a diagrammatic representation of an actuator arrangement in accordance with one embodiment of the invention.

Referring to FIG. 1 there is illustrated an actuator arrangement for use in a thrust reverser system. The actuator arrangement comprises an electrically driven motor 10 arranged to drive a first actuator 12 through a gearbox 14. The first actuator 12 comprises a screw shaft 16 mounted to be rotatable by the operation of the motor 10, but held against axial movement by bearings (not shown). A translating nut 18 cooperates with thread formations formed on the screw shaft 16, the nut 18 being held against rotation but being free to undergo translational motion. It will be appreciated that, in use, operation of the motor 10 to drive the screw shaft 16 results in translation of the nut 18, the direction of movement of the nut 18 being dependent upon the direction of rotary motion of the screw shaft 16. In order to reduce frictional forces resisting movement of the nut 18, the cooperation between the nut 18 and thread formations is conveniently in the form of a ball-screw or roller-screw type cooperation.

The translating nut 18 is connected to or forms part of a tail tube 20 which is formed with a mounting 22 whereby it is connected to a generally part cylindrical thrust reverser cowl 24.

The motor 10 is controlled, in use, by an electrical trust reverser actuator system controller (not shown) which receives information representative of the position of first actuator 12 and the cowl 24 from a LVDT 26 driven from the gearbox 14.

The actuator arrangement further comprises a pair of second actuators 28 which are identical to one another, the first actuator 12 being located between the second actuators 28. The second actuators 28 are driven from the gearbox 14 through drive shafts 30 and gear arrangements 32. Each second actuator 28, like the first actuator 12, comprises a rotatable screw shaft 34 which cooperates through a ball-screw or roller-screw type arrangement with a translatable nut 36. The nut 36 is connected to or forms part of a tail tube 38 which, like the tail tube 20 of the first actuator 12, is connected to the cowl 24.

The first actuator 12 is provided with limit stops operable to determine the range of extension thereof. The limit stops comprise first claw stop members 40a, 40b associated with the shaft 16 and nut 18, respectively, and engageable with one another to limit movement of the nut 18 in the stow direction, and second claw stop members 42a, 42b associated with the shaft 16 and nut 18, respectively, and engageable with one another to limit movement of the nut 18 in the deploy direction. Similarly, the second actuators 28 are each provided with corresponding first and second claw stop members 44a, 44b, 46a, 46b. However, the positioning of the stop members 44a, 44b, 46a, 46b of the second actuators 28 is chosen such that the permitted range of extension of the first actuator 12 as determined by the first and second stop members 40a, 40b, 42a, 42b is smaller than the permitted range of movement of the second actuators 28 as determined by the stop members 44a, 44b, 46a, 46b. In FIG. 1, the permitted range of extension of the first actuator 12 is denoted by 'A', and the range of extension of the second actuators 28 is denoted by 'a', these dimensions being exaggerated in FIG. 1 for clarity. It will be apparent that range 'a' extends beyond range 'A' at both limits of movement. Thus, as the actuator arrangement is driven towards and reaches both its stowed limit position and its deployed limit position, the claw stop members 40a, 40b, 42a, 42b of the first actuator 12 engage to arrest movement, the stop members 44a, 44b, 46a, 46b of the second actuators remaining out of engagement with one another. As only the stop members of the first actuator 12 serve to arrest movement, in use, only these stops need to be of sufficiently large dimensions to be able to withstand the loadings applied in a powered runaway event. The stop members of the second actuators serve primarily to prevent overextension of the second actuators, and associated disengagement of components thereof, during servicing, fitting and maintenance operations, and so can be of relatively small dimensions as the loadings applied thereto are relatively small.

In normal use, when the cowl 24 is to be moved to its deployed position, the motor 10 is operated to drive the first and second actuators 12, 28 towards their deployed positions. As the deployed position is approached, as sensed by the LVDT 26, the controller reduces the operating speed of the motor 10 such that the rate of extension of the actuators 12, 28 is reduced, extension being arrested when the fully deployed position is reached by engagement of the second stop members 42a, 42b of the first actuator 12 with one another. The stop members of the second actuators 28 remain spaced apart from one another.

To return the cowl 24 to its stowed position, the motor 10 is driven in the reverse direction. As the stowed position is approached, the motor operation is controlled to slow the actuator speed, and movement is arrested once the stowed position is reached by the cooperation of the first stop members 40a, 40b of the first actuator 12. The stop members of the second actuators again remain spaced apart from one another.

In the event of a control failure leading to a powered runaway condition during movement in either the stow direction or the deploy direction, the motor 10 will drive the actuators 12, 28 at high speed, and the appropriate ones of the stop members 40a, 40b, 42a, 42b of the first actuator 12 will engage one another (depending upon the operating direction of the actuator when the powered runaway condition arises) to arrest the movement of the first actuator 12 when its limit position is reached. Continued movement of the second actuators 28 will result in torsional movement or winding up of the drive shafts 30. Such winding up of the drive shafts 30 will apply a braking force to the second actuators 28 which will result in movement of these actuators being slowed and arrested before the stop members thereof engage, and subsequently the drive shafts 30 will return to their unwound condition.

It will be appreciated that as only the stop members 40a, 40b, 42a, 42b of the first actuator 12 serve to arrest actuator movement at the stowed and deployed positions, only these stop members need to be sufficiently large to bear the loading applied in a powered runaway event, thus only the first actuator 12 needs to have a tail tube of increased diameter. Consequently, significant weight savings can be made.

In the arrangement described hereinbefore, the claw stop members are all fixed stops. Rather than provide fixed stops, it is thought that the use of compliant stops to reduce the actuator operating speed before it is finally arrested will allow a reduction in the radial dimensions of the limit stops provided on the first actuator 12. Consequently, a small diameter tail tube may be used which may result in further weight savings being possible.

Figure 2:
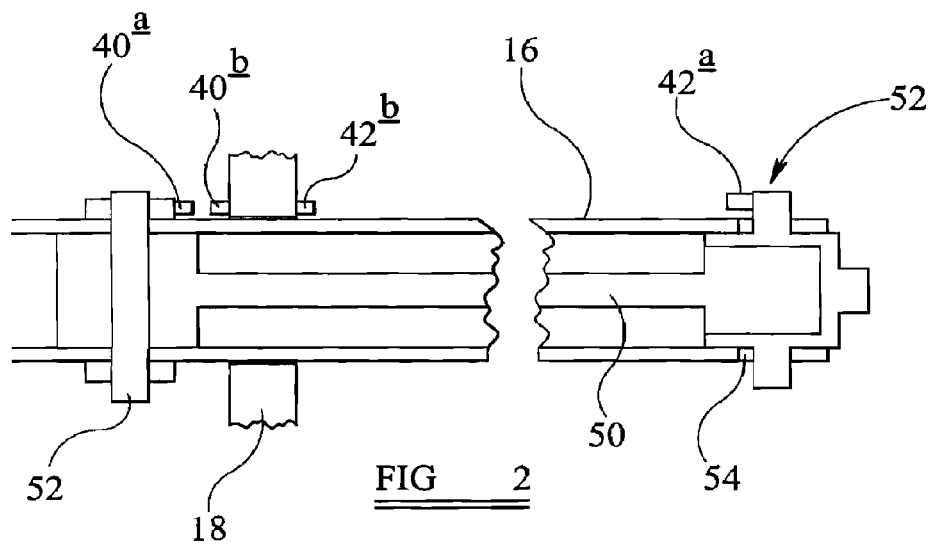
FIGS. 2 and 3 illustrate one form of compliant stop in accordance with an embodiment of the invention and suitable for use in the arrangement of FIG. 1.
Figure 3A:
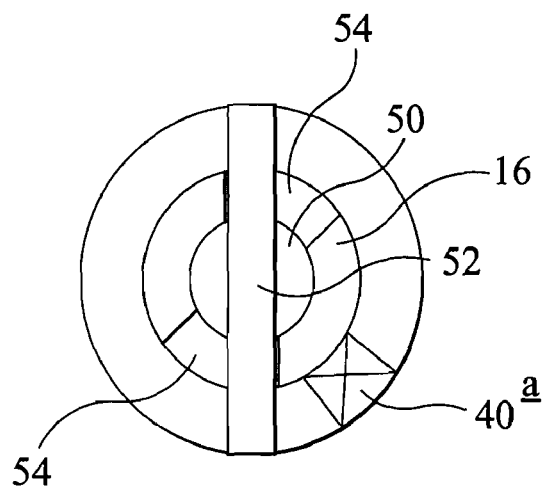
Figure 3B:
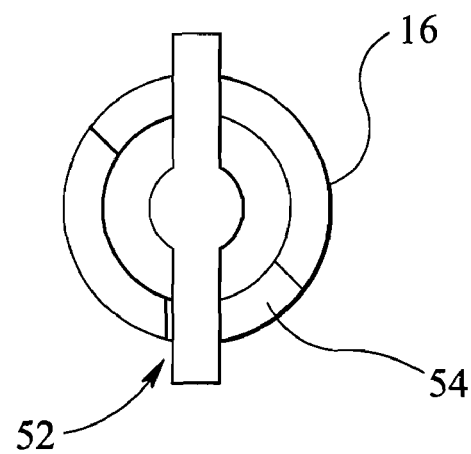

FIG. 2 illustrates one way of providing the first actuator 12 with compliant stops. As illustrated in FIG. 2, the screw shaft 16 is of hollow form. Within the screw shaft 16 is located a multi-part torsion bar 50 to which are secured pins 52, the pins 52 each passing through slots 54 formed in the screw shaft 16, the projecting parts of the pins 52 defining or having the stop members 40a, 42a secured thereto. As best seen in FIGS. 3a and 3b, the slots 54 are each shaped so as to allow the pins 52 to undergo angular movement about the axis of the screw shaft 16. Although illustrated as lying in the same plane as one another, the pins 52 may be angularly displaced relative to one another. The torsion bar 50 is prestressed in that, during assembly, the torsion bar 50 is introduced into the screw shaft from the free end thereof and one of the pins 52 furthest from the free end of the shaft 16 is introduced through the corresponding slot 54 and through an opening in the bar 50. A torque is then applied to the bar 50 to prestress the bar 50 by a predetermined amount, and the other pin 52 is then introduced axially into its respective slot 54 and coupled to the bar. The torque may be applied by using an appropriate tool to engage, for example, flats formed at an end of the bar 50.

In use, when the actuator is being driven towards and approaches its deployed position, the stop member 42b moves into engagement with the stop member 42a, urging the corresponding pin 52 to undergo angular movement as permitted by the slot 54. The arrangement is such that, in order for such angular movement to occur, further stressing of the torsion bar 50 must occur, the other pin 52 already being located hard against the corresponding end of its slot 54 and so being unable to undergo further angular movement. The further stressing of the torsion bar 50 serves to apply a braking load, slowing and subsequently arresting movement of the actuator 12. Similarly, movement of the actuator 12 towards its stowed position is slowed and arrested by stressing of the torsion bar 50, in this case by engagement between the stop members 40a, 40b.

The arrangement illustrated in FIGS. 2 and 3 uses the torsion bar 50 to apply a braking load to slow and arrest movement in both directions. However, if desired, one end of the torsion bar 50 could be anchored against movement relative to the screw shaft 12, for example by a pin received in a correspondingly sized opening formed in the screw shaft 16, so that the torsion bar 50 serves to slow and arrest movement in only one direction. Such an arrangement may be advantageous where there are concerns that the formation of a slot 54 may unduly weaken the screw shaft 16.

Although the arrangement illustrated in FIG. 2 has two separate pins 52, an arrangement is envisaged in which one of the pins 52 (the one adjacent the free end of the screw shaft 16) is integral with the torsion bar 50, the prestressing of the torsion bar being achieved by applying a torque to the other end thereof prior to introduction of the corresponding pin 52.

Figure 4:
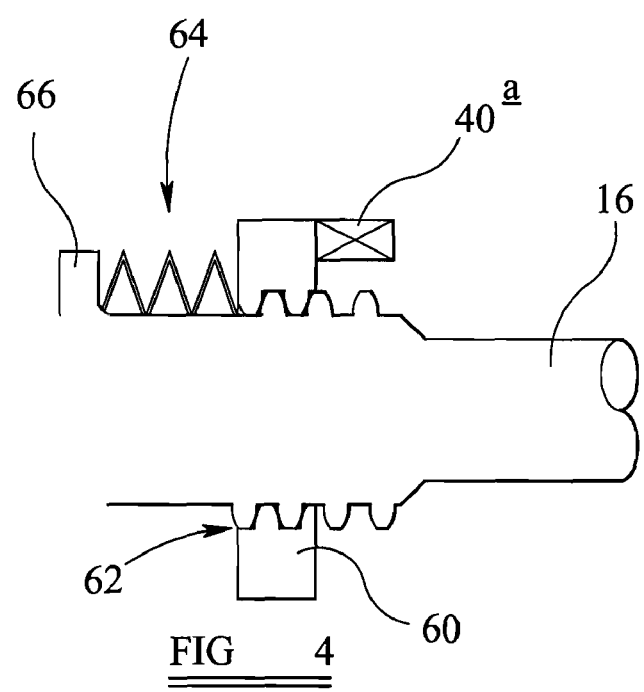
FIG. 4 illustrates another form of compliant stop.

FIG. 4 shows an arrangement in which the compliant stop is formed by a stop member 60 mounted upon the screw shaft 16 by an acme screw thread 62. The stop member 40a is formed on the stop member 60. A spring 64 is engaged between the stop member 60 and a shoulder 66 formed on the screw shaft 16.

In use, as the actuator 12 is moved towards its stowed position, the stop member 40b engages the stop member 40a. The acme screw thread 62 allows the stop member 60 to move relatively freely on the screw shaft 16, but movement of the stop member 60 is resisted by the spring 64. It will be appreciated, therefore, that upon engagement of the stop members 40a, 40b, movement of the actuator is slowed and subsequently arrested. The spring 64 is illustrated as comprising a series of disc springs, but could alternatively comprise a coiled spring, for example.

The arrangement shown in FIG. 4 is intended for use in slowing and arresting movement to the stowed position, but could alternatively or additionally be used to slow and arrest movement to the deployed position. Further, the FIG. 4 arrangement could be used in combination with, for example, a torsion bar arrangement. For example, the torsion bar arrangement could be used to slow and arrest movement to the deployed position whilst the spring biased arrangement is used to slow and arrest movement to the stowed position.

The position of arrangements using compliant stops is thought to allow a reduction in the radial size of the stops, thus permitting a smaller size of tail tube to be used.

It will be appreciated that a wide range of modifications and alterations may be made to the arrangements described hereinbefore without departing from the scope of the invention.

The invention claimed is:

1. An actuator arrangement comprising a plurality of linearly extendable actuators arranged to be driven by a common electrically driven motor, each actuator being provided with limit stops to limit extension and/or retraction thereof, wherein the limit stops of the actuators are positioned such that a first one of the actuators has a smaller range of permitted extension than at least a second one of the actuators.

2. An arrangement according to claim 1, wherein the limit stops of the first actuator engage to arrest movement both when the actuator reaches its fully deployed and stowed positions.

3. An arrangement according to claim 1, wherein the first actuator is provided with a position sensor, the output of which can be used to provide an indication of the position of the cowl associated therewith.

4. An arrangement according to claim 3, wherein the position sensor comprises a linear variable differential transducer.

5. An arrangement according to claim 1, wherein a series of drive shafts are provided to transmit drive to at least some of the actuators.

6. An arrangement according to claim 5, wherein the drive shafts are capable of undergoing limited torsional movement.

7. An arrangement according to claim 1, wherein the limit stop of the first actuator operable as the actuator reaches its fully deployed position is compliant.

8. An arrangement according to claim 1, wherein the limit stop operable as the first actuator reaches its stowed position is compliant.

9. An arrangement according to claim 7, wherein the actuator includes a screw shaft of hollow form, and the compliant stop is provided by locating a torsion bar within the screw shaft, a stop member being associated with the torsion bar, the stop member projecting through a slot formed in the shaft and engageable by a stop associated with a nut translatable along the screw shaft.

10. An arrangement according to claim 7, wherein at least one of the compliant stops comprises a stop member spring biased towards a stop position such that, in use, once the stop position is reached, the spring biasing applies a braking load prior to arresting actuator movement.

11. An arrangement according to claim 10, wherein the stop member is mounted on the actuator shaft by means of an acme screw thread.

12. An arrangement according to claim 10, wherein the spring comprises one of a coiled spring and at least one disc spring.

13. An electrical thrust reverser system comprising an extendable actuator driven by an electric motor, the actuator including a rotatable screw shaft and a translatable nut, the actuator being provided with limit stops to limit the permitted range of extension of the actuator, at least one of the limit stops being compliant, wherein the compliant stop is provided by locating a torsion bar within the screw shaft, a stop member being associated with the torsion bar, the stop member projecting through a slot formed in the shaft and engageable by a stop associated with the nut translatable along the screw shaft.

* * * * *